United States Patent
Asanuma

(10) Patent No.: US 12,327,890 B2
(45) Date of Patent: Jun. 10, 2025

(54) FUEL CELL COOLING SYSTEM

(71) Applicant: TOYOTA JIDOSHA KABUSHIKI KAISHA, Toyota (JP)

(72) Inventor: Daisaku Asanuma, Gamagori (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 570 days.

(21) Appl. No.: 17/806,616

(22) Filed: Jun. 13, 2022

(65) Prior Publication Data
US 2023/0008243 A1    Jan. 12, 2023

(30) Foreign Application Priority Data
Jul. 7, 2021    (JP) ................................ 2021-113121

(51) Int. Cl.
H01M 8/04029    (2016.01)
H01M 8/04007    (2016.01)
H01M 8/04701    (2016.01)
H01M 8/04746    (2016.01)

(52) U.S. Cl.
CPC ... *H01M 8/04029* (2013.01); *H01M 8/04067* (2013.01); *H01M 8/04723* (2013.01); *H01M 8/04768* (2013.01)

(58) Field of Classification Search
None
See application file for complete search history.

(56) References Cited

U.S. PATENT DOCUMENTS

| | | | |
|---|---|---|---|
| 2003/0217559 A1* | 11/2003 | Leda ................. | H01M 8/04604 62/230 |
| 2004/0108148 A1* | 6/2004 | Vanderwees ............ | B60L 58/33 180/68.1 |
| 2007/0298298 A1* | 12/2007 | Ishigaki ............ | H01M 8/04014 429/429 |
| 2011/0226048 A1* | 9/2011 | Maier ............... | H01M 8/04597 73/114.68 |
| 2017/0191567 A1* | 7/2017 | Na .......................... | F16K 17/30 |
| 2019/0181476 A1* | 6/2019 | Jeong ................ | H01M 8/04358 |
| 2021/0028468 A1* | 1/2021 | Lee .................... | H01M 8/04302 |
| 2022/0320548 A1* | 10/2022 | Miyazaki .......... | H01M 8/04738 |
| 2022/0416277 A1* | 12/2022 | Song .................. | H01M 8/04358 |
| 2023/0006224 A1* | 1/2023 | Won .................... | B60H 1/00864 |
| 2023/0008445 A1* | 1/2023 | Choi ................. | H01M 8/04074 |

FOREIGN PATENT DOCUMENTS

JP    2008126911 A    6/2008
JP    2021005511 A    1/2021

* cited by examiner

*Primary Examiner* — Haroon S. Sheikh
(74) *Attorney, Agent, or Firm* — SoraIP, Inc.

(57) ABSTRACT

A fuel cell cooling system mounted on a vehicle includes a flow path for a coolant; a cooling unit that cools the coolant in a cooling unit flow path; a fuel cell to be cooled through heat exchange with the coolant in a fuel cell flow path; a heat generating body to be cooled through heat exchange with the coolant in a heat generating body flow path; first and second pumps that pump the coolant in the fuel cell and heat generating body flow paths, respectively; and a control circuit. When the vehicle is started, the control circuit performs a first process of actuating the first pump with the second pump stopped, and a second process of actuating the first and second pumps when the temperature of the coolant in the fuel cell or cooling unit flow path exceeds a first reference value during the first process.

10 Claims, 5 Drawing Sheets

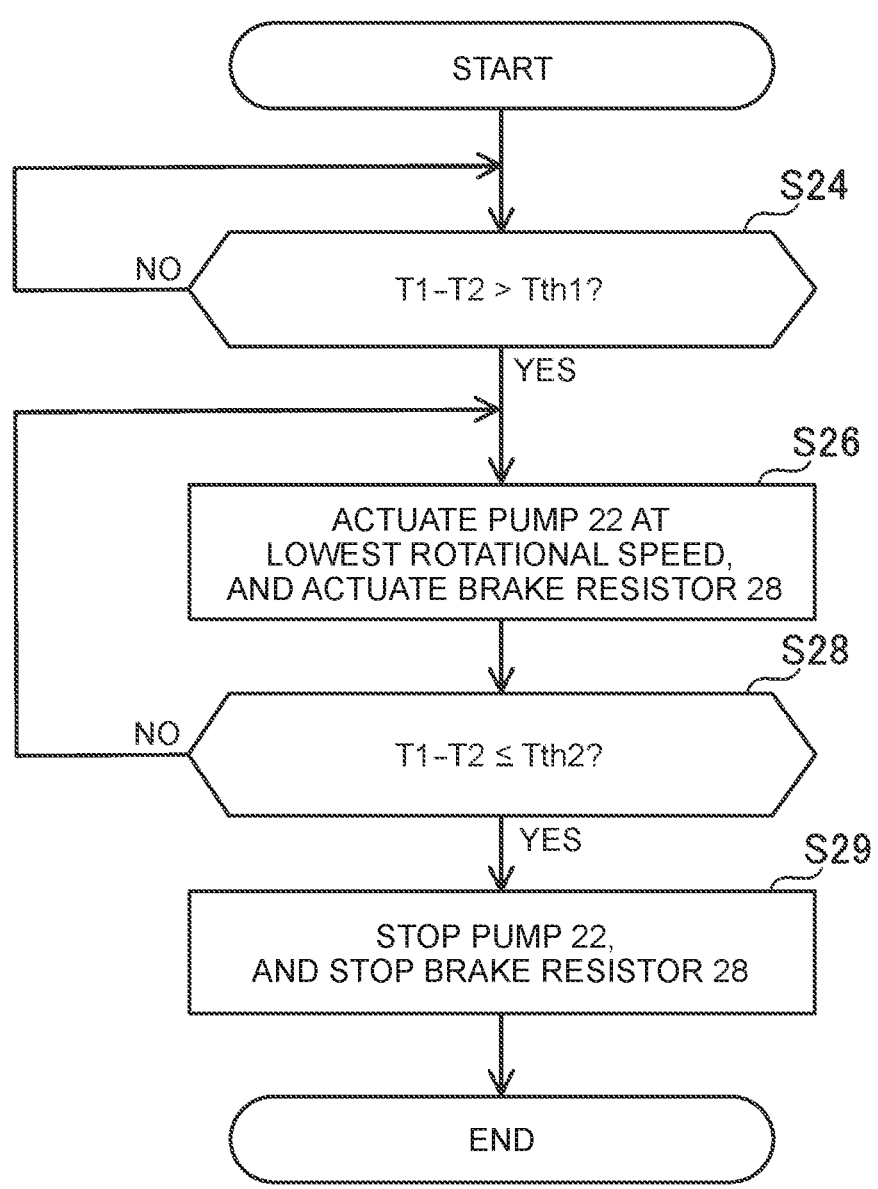

FUEL CELL COOLING SYSTEM

CROSS-REFERENCE TO RELATED APPLICATION

This application claims priority to Japanese Patent Application No. 2021-113121 filed on Jul. 7, 2021, incorporated herein by reference in its entirety.

BACKGROUND

1. Technical Field

The technology disclosed herein relates to a fuel cell cooling system.

2. Description of Related Art

Japanese Unexamined Patent Application Publication No. 2008-126911 (JP 2008-126911 A) discloses a fuel cell cooling system that cools a fuel cell mounted on a vehicle. The fuel cell cooling system includes a coolant flow path inside which a coolant flows. The coolant flow path is provided with a cooling unit that cools the coolant in the coolant flow path and a fuel cell to be cooled through heat exchange with the coolant in the coolant flow path. The fuel cell is cooled by supplying the coolant that has been cooled by the cooling unit to the fuel cell.

SUMMARY

A flow path for cooling another heat generating body is occasionally provided in parallel with the flow path in which the fuel cell is provided. Hereinafter, the flow path in which the fuel cell is provided will be referred to as a "fuel cell flow path", and the flow path in which the heat generating body is provided will be referred to as a "heat generating body flow path". In addition, the flow path in which the cooling unit is provided will be referred to as a "cooling unit flow path". The coolant is occasionally circulated through the fuel cell flow path and the cooling unit flow path with no coolant caused to flow through the heat generating body flow path. In this state, the temperature of the coolant in the fuel cell flow path and the cooling unit flow path is higher than the temperature of the coolant in the heat generating body flow path. When the coolant is caused to flow through the heat generating body flow path after that, the coolant at a low temperature in the heat generating body flow path flows into the fuel cell flow path. Consequently, the fuel cell is cooled abruptly, which applies a thermal load to the fuel cell. A technology for reducing a thermal load to be applied to a fuel cell is proposed herein.

An aspect disclosed herein provides a first fuel cell cooling system mounted on a vehicle. The fuel cell cooling system includes a coolant flow path inside which a coolant flows. The coolant flow path includes a cooling unit flow path, a fuel cell flow path, and a heat generating body flow path. An upstream end of the fuel cell flow path and an upstream end of the heat generating body flow path are connected to a branched portion provided at a downstream end of the cooling unit flow path. A downstream end of the fuel cell flow path and a downstream end of the heat generating body flow path are connected to a merged portion provided at an upstream end of the cooling unit flow path. The fuel cell cooling system further includes: a cooling unit configured to cool the coolant in the cooling unit flow path; a fuel cell configured to be cooled through heat exchange with the coolant in the fuel cell flow path; a heat generating body configured to generate heat when actuated and configured to be cooled through heat exchange with the coolant in the heat generating body flow path; a first pump configured to pump the coolant in the fuel cell flow path to a downstream side; a second pump configured to pump the coolant in the heat generating body flow path to a downstream side; and a control circuit configured to control the fuel cell, the first pump, and the second pump. The control circuit is configured to actuate the fuel cell and the first pump during travel of the vehicle. The control circuit is configured to actuate the second pump while the heat generating body is actuated. The control circuit is configured to perform, when the vehicle is started, a first process of actuating the first pump with the second pump stopped, and a second process of actuating the second pump in addition to the first pump when a temperature of the coolant in the fuel cell flow path or the cooling unit flow path exceeds a first reference value during the first process.

In the first fuel cell cooling system according to the above aspect, the control circuit performs the first process of actuating the first pump with the second pump stopped when the vehicle is started. Thus, in the first process, the coolant is circulated through the fuel cell flow path and the cooling unit flow path, and the coolant does not flow through the heat generating body flow path. The coolant circulated through the fuel cell flow path and the cooling unit flow path is heated by the fuel cell to a higher temperature. The temperature of the circulated coolant can be raised more quickly by circulating the coolant through the fuel cell flow path and the cooling unit flow path without causing the coolant to flow through the heat generating body flow path. Consequently, the temperature of the fuel cell can be raised more quickly. Thus, the power generation efficiency of the fuel cell is raised in a short time after the vehicle is started. In addition, the control circuit performs the second process of actuating the second pump in addition to the first pump when the temperature of the coolant in the fuel cell flow path or the cooling unit flow path exceeds the first reference value during the first process. In the second process, the coolant is circulated through the circulation flow path constituted by the fuel cell flow path, the heat generating body flow path, and the cooling unit flow path. That is, the coolant in the heat generating body flow path is circulated together with the coolant in the fuel cell flow path and the cooling unit flow path. Thus, the temperature of the coolant in the heat generating body flow path is raised. The control circuit performs normal control after starting of the vehicle is completed. In the normal control, the control circuit actuates the fuel cell and the first pump during travel of the vehicle, and actuates the second pump while the heat generating body is actuated. Thus, when the heat generating body is actuated, the coolant in the heat generating body flow path flows into the fuel cell flow path as the second pump is actuated. At this time, the coolant in the heat generating body flow path has been warmed beforehand, and thus no abrupt temperature variations are likely to be caused in the fuel cell. Thus, a thermal load to be applied to the fuel cell is reduced.

Another aspect disclosed herein provides a second fuel cell cooling system mounted on a vehicle. The fuel cell cooling system includes a coolant flow path inside which a coolant flows. The coolant flow path includes a cooling unit flow path, a fuel cell flow path, and a heat generating body flow path. An upstream end of the fuel cell flow path and an upstream end of the heat generating body flow path are connected to a branched portion provided at a downstream end of the cooling unit flow path. A downstream end of the fuel cell flow path and a downstream end of the heat generating body flow path are connected to a merged portion provided at an upstream end of the cooling unit flow path. The fuel cell cooling system further includes: a cooling unit configured to cool the coolant in the cooling unit flow path; a fuel cell configured to be cooled through heat exchange with the coolant in the fuel cell flow path; a heat generating body configured to generate heat when actuated and configured to be cooled through heat exchange with the coolant in the heat generating body flow path; a first pump configured to pump the coolant in the fuel cell flow path to a downstream side; a second pump configured to pump the coolant in the heat generating body flow path to a downstream side; and a control circuit configured to control the fuel cell, the first pump, and the second pump. The control circuit is configured to actuate the fuel cell and the first pump during travel of the vehicle. The control circuit is configured to actuate the second pump while the heat generating body is actuated. The control circuit is configured to perform a first process of actuating the first pump and the second pump when the vehicle is started.

In the second fuel cell cooling system according to the above aspect, the control circuit performs the first process of actuating the first pump and the second pump when the vehicle is started. Thus, in the first process, the coolant is circulated through the circulation flow path constituted by the fuel cell flow path, the heat generating body flow path, and the cooling unit flow path, and the temperature of the coolant in the heat generating body flow path is raised. The control circuit performs normal control after starting of the vehicle is completed. In the normal control, the control circuit actuates the fuel cell and the first pump during travel of the vehicle, and actuates the second pump while the heat generating body is actuated. Thus, when the heat generating body is actuated, the coolant in the heat generating body flow path flows into the fuel cell flow path as the second pump is actuated. At this time, the coolant in the heat generating body flow path has been warmed beforehand, and thus no abrupt temperature variations are likely to be caused in the fuel cell. Thus, a thermal load to be applied to the fuel cell is reduced.

Another aspect disclosed herein provides a third fuel cell cooling system mounted on a vehicle. The fuel cell cooling system includes a coolant flow path inside which a coolant flows. The coolant flow path includes a cooling unit flow path, a fuel cell flow path, and a heat generating body flow path. An upstream end of the fuel cell flow path and an upstream end of the heat generating body flow path are connected to a branched portion provided at a downstream end of the cooling unit flow path. A downstream end of the fuel cell flow path and a downstream end of the heat generating body flow path are connected to a merged portion provided at an upstream end of the cooling unit flow path. The fuel cell cooling system further includes: a cooling unit configured to cool the coolant in the cooling unit flow path; a fuel cell configured to be cooled through heat exchange with the coolant in the fuel cell flow path; a heat generating body configured to generate heat when actuated and configured to be cooled through heat exchange with the coolant in the heat generating body flow path; a first pump configured to pump the coolant in the fuel cell flow path to a downstream side; a second pump configured to pump the coolant in the heat generating body flow path to a downstream side; and a control circuit configured to control the fuel cell, the first pump, and the second pump. The control circuit is configured to actuate the fuel cell and the first pump during travel of the vehicle. The control circuit is configured to actuate the second pump while the heat generating body is actuated. The control circuit is configured to perform a first process of actuating the second pump when a difference between a temperature of the coolant in the fuel cell flow path and a temperature of the coolant in the heat generating body flow path exceeds a first reference value when the heat generating body is not actuated during travel of the vehicle.

In the third fuel cell cooling system according to the above aspect, the control circuit actuates the fuel cell and the first pump during travel of the vehicle, and actuates the second pump while the heat generating body is actuated. In the state in which the heat generating body is not actuated and the second pump is not actuated, the coolant is circulated through the fuel cell flow path and the cooling unit flow path, and the coolant in the heat generating body flow path does not flow. When the amount of heat generated by the fuel cell is large, the temperature of the coolant circulated through the fuel cell flow path and the cooling unit flow path is raised. On the other hand, the coolant in the heat generating body flow path does not flow, and thus the temperature of the coolant in the heat generating body flow path is not raised. The control circuit performs the first process of actuating the second pump when the difference between the temperature of the coolant in the fuel cell flow path and the temperature of the coolant in the heat generating body flow path exceeds the reference value when the heat generating body is not actuated during travel of the vehicle. That is, both the first pump and the second pump are actuated in the first process. Thus, the coolant is circulated through the circulation flow path constituted by the fuel cell flow path, the heat generating body flow path, and the cooling unit flow path, and the difference in the temperature of the coolant in the circulation flow path is reduced. Consequently, the difference between the temperature of the coolant in the fuel cell flow path and the temperature of the coolant in the heat generating body flow path becoming significantly large is suppressed. Thus, no abrupt temperature variations are likely to be caused in the fuel cell even if the coolant in the heat generating body flow path flows into the fuel cell flow path as the heat generating body is actuated and the second pump is actuated. Thus, a thermal load to be applied to the fuel cell is reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart illustrating preliminary operation according to a fourth embodiment.

DETAILED DESCRIPTION OF EMBODIMENTS

In an example of the first fuel cell cooling system described above, the control circuit may be configured to perform a third process of stopping the second pump when a temperature of the coolant in the coolant flow path exceeds a second reference value during the second process.

With this configuration, it is possible to suppress power consumption by stopping the second pump when the difference in the temperature of the coolant is reduced.

In an example of the first fuel cell cooling system described above, the control circuit may be configured to actuate the second pump at a lowest rotational speed in the second process.

Herein, the lowest rotational speed is the minimum value of the usable rotational speed defined as the specifications of a pump.

In the second process, the second pump is actuated in order to merge the coolant in the heat generating body flow path with the coolant in the fuel cell flow path and the cooling unit flow path. The coolant in the heat generating body flow path is slowly mixed with the coolant in the fuel cell flow path and the cooling unit flow path by actuating the second pump at the lowest rotational speed. Thus, it is possible to suppress abrupt temperature variations in the fuel cell in the second process.

In an example of the second fuel cell cooling system described above, the control circuit may be configured to perform a second process of stopping the second pump when a temperature of the coolant in the coolant flow path exceeds a reference value during the first process.

With this configuration, it is possible to suppress power consumption by stopping the second pump when the difference in the temperature of the coolant is reduced.

In an example of the second fuel cell cooling system described above, the control circuit may be configured to actuate the second pump at a lowest rotational speed in the first process.

In an example of the third fuel cell cooling system described above, the control circuit may be configured to perform a second process of stopping the second pump when the difference between the temperature of the coolant in the fuel cell flow path and the temperature of the coolant in the heat generating body flow path falls below a second reference value during the first process.

With this configuration, it is possible to suppress power consumption by stopping the second pump when the difference in the temperature of the coolant is reduced.

In an example of the third fuel cell cooling system described above, the control circuit may be configured to actuate the heat generating body in the first process.

With this configuration, the difference in the temperature of the coolant can be reduced in a shorter time.

In an example of the third fuel cell cooling system described above, the control circuit may be configured to actuate the second pump at a lowest rotational speed in the first process.

Figure 1:
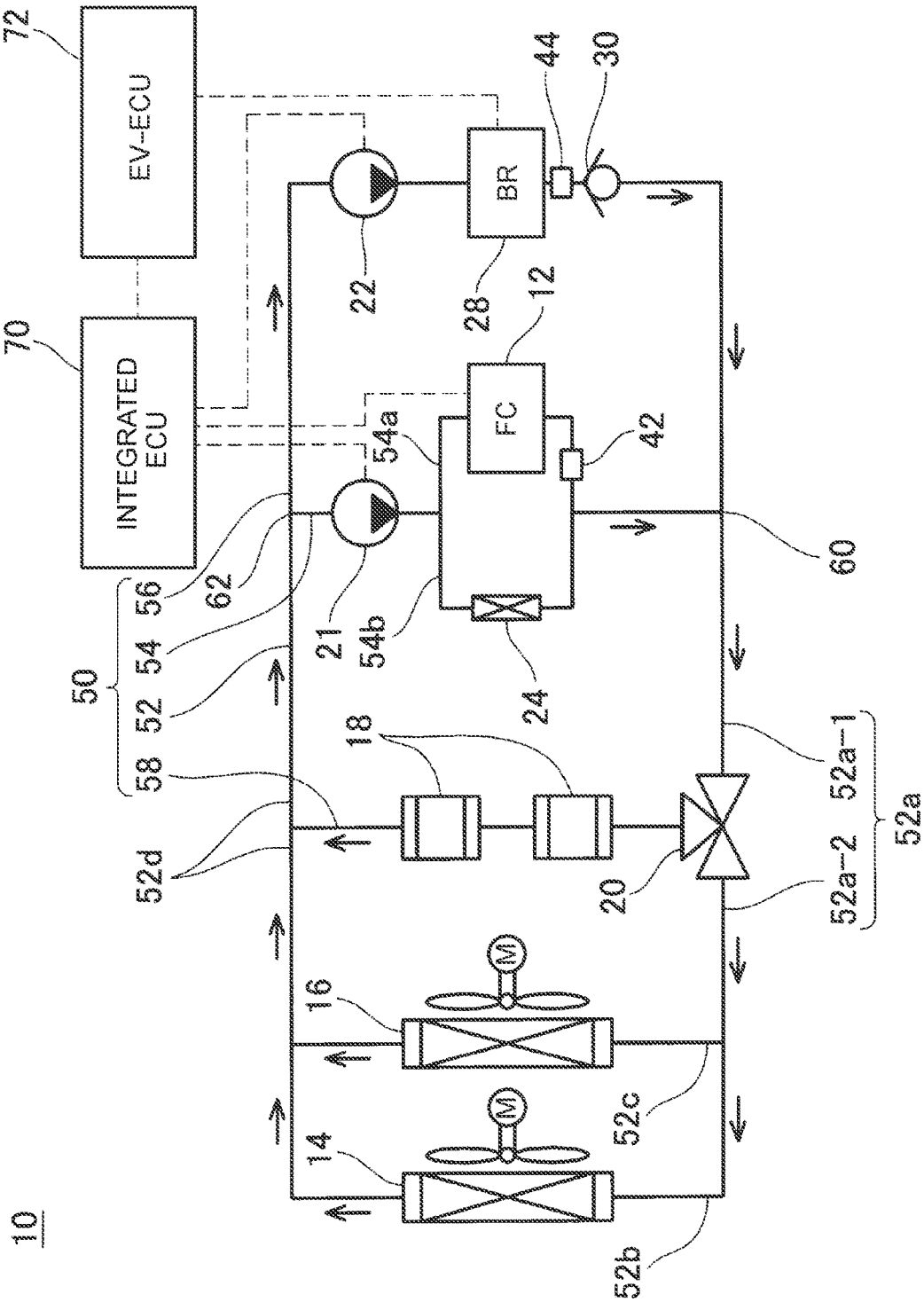
FIG. 1 is a coolant circuit diagram illustrating the configuration of a fuel cell cooling system.

A fuel cell cooling system 10 according to an embodiment illustrated in FIG. 1 is mounted on a vehicle. The fuel cell cooling system 10 includes a fuel cell (FC) 12. The fuel cell 12 supplies electric power to a motor for travel of the vehicle. The fuel cell cooling system 10 cools the fuel cell 12.

The fuel cell cooling system 10 includes a coolant flow path 50 inside which a coolant is circulated. The coolant flow path 50 includes a cooling unit flow path 52, a fuel cell flow path 54, a heat generating body flow path 56, and a bypass flow path 58.

The cooling unit flow path 52 extends from a merged portion 60 to a branched portion 62. The cooling unit flow path 52 includes an upstream flow path 52a, a branched flow path 52b, a branched flow path 52c, and a downstream flow path 52d. The upstream end of the upstream flow path 52a is connected to the merged portion 60 which is the upstream end of the cooling unit flow path 52. The branched flow paths 52b and 52c are two flow paths branched on the downstream side of the upstream flow path 52a. The downstream ends of the branched flow paths 52b and 52c are connected to the upstream end of the downstream flow path 52d. The downstream end of the downstream flow path 52d is connected to the branched portion 62 that is the downstream end of the cooling unit flow path 52. The coolant in the cooling unit flow path 52 flows from the merged portion 60 that is the upstream end thereof, to the branched portion 62 that is the downstream end thereof, by way of the upstream flow path 52a, the branched flow paths 52b and 52c, and the downstream flow path 52d. The coolant is divided to flow through the branched flow paths 52b and 52c. The branched flow path 52b is provided with a radiator 14. The radiator 14 cools the coolant that flows in the branched flow path 52b through heat exchange with the outside air. The branched flow path 52c is provided with a radiator 16. The radiator 16 cools the coolant that flows in the branched flow path 52c through heat exchange with the outside air.

The upstream end of the bypass flow path 58 is connected to an intermediate point of the upstream flow path 52a of the cooling unit flow path 52. The downstream end of the bypass flow path 58 is connected to an intermediate point of the downstream flow path 52d of the cooling unit flow path 52. A rotary valve 20 is provided at the connection portion between the bypass flow path 58 and the upstream flow path 52a. Hereinafter, a portion of the upstream flow path 52a upstream of the rotary valve 20 will be referred to as a "first portion 52a-1", and a portion of the upstream flow path 52a downstream of the rotary valve 20 will be referred to as a "second portion 52a-2". The rotary valve 20 changes the flow rate of the coolant that flows from the first portion 52a-1 to the bypass flow path 58 and the flow rate of the coolant that flows from the first portion 52a-1 to the second portion 52a-2. When a degree of opening S of the rotary valve 20 is 100%, all of the coolant that flows in the first portion 52a-1 flows to the second portion 52a-2. When the degree of opening S of the rotary valve 20 is 50%, half of the coolant that flows in the first portion 52a-1 flows to the second portion 52a-2, and the other half of the coolant that flows in the first portion 52a-1 flows to the bypass flow path 58. When the degree of opening S of the rotary valve 20 is 0%, all of the coolant that flows in the first portion 52a-1 flows to the bypass flow path 58. Ion exchangers 18 are installed in the bypass flow path 58. The ion exchangers 18 remove ions from the coolant that flows in the bypass flow path 58. Ions are eluted from pipes etc. that constitute the coolant flow path 50. The concentration of ions in the coolant can be lowered by causing the coolant to flow through the bypass flow path 58 (i.e. the ion exchangers 18).

The upstream ends of the fuel cell flow path 54 and the heat generating body flow path 56 are connected to the downstream end of the cooling unit flow path 52 at the branched portion 62. The downstream ends of the fuel cell flow path 54 and the heat generating body flow path 56 are connected to the upstream end of the cooling unit flow path 52 at the merged portion 60.

A pump 21 is interposed in the fuel cell flow path 54. The pump 21 pumps the coolant in the fuel cell flow path 54 to the downstream side. The fuel cell flow path 54 is branched into a branched flow path 54a and a branched flow path 54b on the downstream side of the pump 21. The fuel cell 12 and a temperature sensor 42 are installed in the branched flow path 54*a*. The fuel cell 12 is cooled through heat exchange with the coolant that flows in the branched flow path 54*a*. The temperature sensor 42 is disposed downstream of the fuel cell 12. The temperature sensor 42 detects a temperature T1 of the coolant that has passed through the fuel cell 12. An intercooler 24 is installed in the branched flow path 54*b*. The intercooler 24 is cooled through heat exchange with the coolant that flows in the branched flow path 54*b*.

A pump 22, a brake resistor (BR) 28, a temperature sensor 44, and a check valve 30 are installed in the heat generating body flow path 56. The pump 22 pumps the coolant in the heat generating body flow path 56 to the downstream side. The brake resistor 28 is installed downstream of the pump 22. The brake resistor 28 is occasionally called an "extra electric power heater" or an "electric heater". When a motor of the vehicle performs regenerative operation with a battery fully charged, the brake resistor 28 consumes extra electric power generated through the regenerative operation by converting the extra electric power into thermal energy. The brake resistor 28 is cooled through heat exchange with the coolant in the heat generating body flow path 56. The temperature sensor 44 is disposed downstream of the brake resistor 28. The temperature sensor 44 detects a temperature T2 of the coolant that has passed through the brake resistor 28. The check valve 30 is disposed downstream of the temperature sensor 44. The check valve 30 suppresses a reverse flow of the coolant in the heat generating body flow path 56.

The fuel cell cooling system 10 includes an integrated electronic control unit (ECU) 70 and an electric vehicle-electronic control unit (EV-ECU) 72 as control circuits. The EV-ECU 72 controls the brake resistor 28 etc. The integrated ECU 70 controls the pumps 21 and 22, the fuel cell 12, etc.

Next, operation of the fuel cell cooling system 10 will be described. The integrated ECU 70 generates power by actuating the fuel cell 12. The vehicle travels using electric power generated by the fuel cell 12. The integrated ECU 70 causes the fuel cell 12 to operate continuously during travel of the vehicle. In addition, the integrated ECU 70 actuates the pump 21 when the vehicle is started. The integrated ECU 70 maintains the pump 21 in the actuated state during travel of the vehicle. When the pump 21 is actuated, the coolant flows through a circulation flow path constituted by the fuel cell flow path 54 and the cooling unit flow path 52. The coolant that flows in the circulation flow path is cooled by the radiators 14 and 16. Thus, the coolant that has been cooled by the radiators 14 and 16 flows into the fuel cell flow path 54 (the branched flow path 54*a*, in particular) to cool the fuel cell 12. Thus, the fuel cell 12 is suppressed from becoming excessively hot. When the pump 21 is actuated with the pump 22 stopped, an inflow of the coolant into the heat generating body flow path 56 from the downstream end of the fuel cell flow path 54 is suppressed by closing the check valve 30. That is, a reverse flow of the coolant through the heat generating body flow path 56 is suppressed by closing the check valve 30.

When the coolant is circulated through the circulation flow path constituted by the fuel cell flow path 54 and the cooling unit flow path 52, the integrated ECU 70 causes a part or all of the coolant that has passed through the first portion 52*a*-1 of the cooling unit flow path 52 to flow through the bypass flow path 58 by controlling the degree of opening S of the rotary valve 20. In this manner, the integrated ECU 70 executes an ion removal process in which ions in the coolant are removed by the ion exchangers 18. The integrated ECU 70 performs the ion removal process when the concentration of ions in the coolant is raised.

When the motor of the vehicle executes regenerative operation with the battery fully charged, the EV-ECU 72 actuates the brake resistor 28. Consequently, extra electric power generated by the motor is consumed by the brake resistor 28. When the brake resistor 28 is actuated, the brake resistor 28 generates heat. When the brake resistor 28 is actuated, the EV-ECU 72 sends such information to the integrated ECU 70. When the brake resistor 28 is actuated, the integrated ECU 70 actuates the pump 22. When the pump 22 is actuated, the check valve 30 is opened to cause the coolant in the heat generating body flow path 56 to flow to the downstream side. Thus, the coolant that has flowed to the branched portion 62 through the cooling unit flow path 52 is branched to flow through the fuel cell flow path 54 and the heat generating body flow path 56. The coolant that has passed through the fuel cell flow path 54 and the coolant that has passed through the heat generating body flow path 56 are merged with each other at the merged portion 60, and flow to the cooling unit flow path 52. When the coolant flows in the heat generating body flow path 56, the brake resistor 28 is cooled by the coolant in the heat generating body flow path 56. Consequently, the brake resistor 28 is suppressed from becoming excessively hot.

Next, preliminary operation performed by the integrated ECU 70 will be described. Preliminary operation according to first to fourth embodiments will be described below.

First Embodiment

Figure 2:
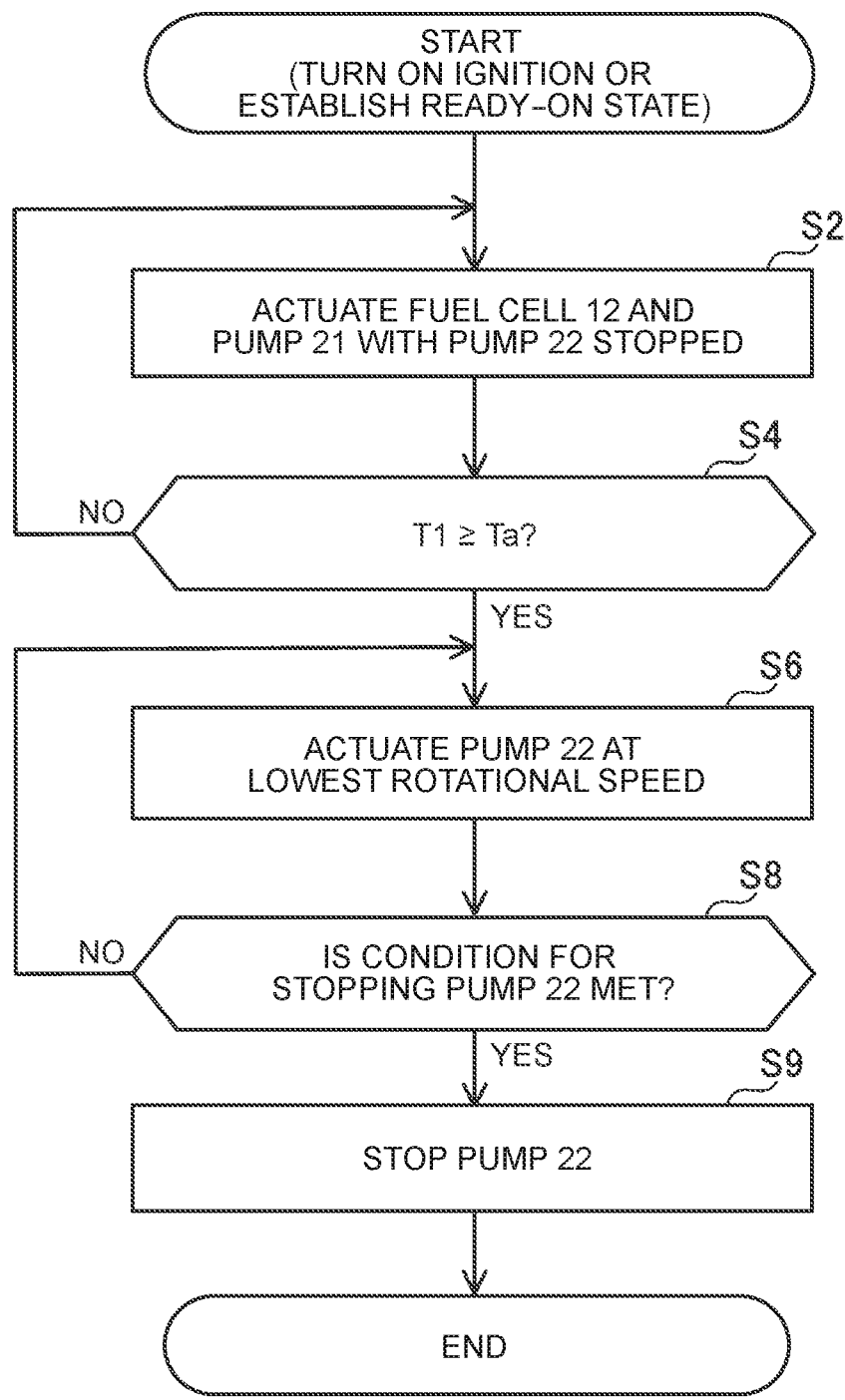
FIG. 2 is a flowchart illustrating preliminary operation according to a first embodiment.

FIG. 2 illustrates the preliminary operation according to the first embodiment. As indicated in FIG. 2, the preliminary operation according to the first embodiment is performed immediately after ignition is turned on or a ready-on state is established (i.e. the vehicle is started). The temperature of the fuel cell 12 and the temperature of the coolant in the coolant flow path 50 are low before the vehicle is started. The integrated ECU 70 performs step S2 immediately after ignition is turned on. In step S2, the integrated ECU 70 actuates the fuel cell 12 and the pump 21 with the pump 22 stopped. Power is generated when the fuel cell 12 is actuated. The coolant is circulated through the circulation flow path constituted by the fuel cell flow path 54 and the cooling unit flow path 52 when the pump 21 is actuated. In step S2, the pump 22 is stopped, and thus the coolant in the heat generating body flow path 56 does not flow. In step S2, the radiators 14 and 16 are actuated. Therefore, the coolant circulated in the circulation flow path constituted by the fuel cell flow path 54 and the cooling unit flow path 52 is heated by the fuel cell 12, and cooled by the radiators 14 and 16. The integrated ECU 70 repeatedly executes step S4 during execution of step S2. In step S4, the integrated ECU 70 determines whether the temperature T1 (i.e. the temperature of the coolant immediately after passing through the fuel cell 12) detected by the temperature sensor 42 is equal to or more than a reference temperature Ta (e.g. 30° C.). The integrated ECU 70 continuously performs step S2 until it is determined in step S4 that the temperature T1 is equal to or more than the reference temperature Ta.

Immediately after step S2 is started, the temperature of the fuel cell 12 is low, and thus the power generation efficiency of the fuel cell 12 is low. The temperature of the fuel cell 12 is raised as the fuel cell 12 is actuated. However, the coolant circulated in the circulation flow path constituted by the fuel cell flow path 54 and the cooling unit flow path 52 cools the fuel cell 12, and thus an abrupt rise in the temperature of the fuel cell 12 is suppressed. The temperature of the fuel cell 12 is raised steadily along with the lapse of time. The temperature of the circulated coolant is gradually raised as the coolant is heated by the fuel cell 12. At this time, the coolant in the heat generating body flow path 56 is not flowing, and thus the amount of the circulated coolant is relatively small. Thus, the temperature of the circulated coolant is raised relatively quickly. Thus, the temperature of the fuel cell 12 is also raised relatively quickly. In this manner, in step S2, the temperature of the fuel cell 12 can be raised relatively quickly by circulating the coolant in the circulation flow path constituted by the fuel cell flow path 54 and the cooling unit flow path 52 with the coolant in the heat generating body flow path 56 kept stationary. Thus, the power generation efficiency of the fuel cell 12 can be raised at a relatively high speed during execution of step S2. The integrated ECU 70 executes step S6 when the temperature T1 of the coolant in the fuel cell flow path 54 reaches the temperature Ta.

Step S4 discussed above is performed in order to determine whether the temperature of the circulated coolant has been raised to a predetermined value. Thus, it may be determined in step S4 whether the temperature of the coolant in the cooling unit flow path 52 has reached a reference value, instead of determining whether the temperature of the coolant in the fuel cell flow path 54 has reached a reference value.

In step S6, the integrated ECU 70 actuates the pump 22 at the lowest rotational speed. That is, in step S6, the integrated ECU 70 actuates the pump 22 at the lowest rotational speed while maintaining the state in which the fuel cell 12 and the pump 21 are actuated. In step S6, the integrated ECU 70 actuates the pump 22 even when the brake resistor 28 is stopped. The integrated ECU 70 repeatedly executes step S8 during execution of step S6. In step S8, the integrated ECU 70 determines whether a condition for stopping the pump 22 is met. The integrated ECU 70 continuously performs step S6 until the condition for stopping the pump 22 is met. When an affirmative determination is made (i.e. the condition for stopping the pump 22 is met) in step S8, the integrated ECU 70 stops the pump 22 in step S9.

In step S6, the pump 22 is actuated, and thus the coolant in the heat generating body flow path 56 flows. That is, in step S6, the coolant is circulated in the circulation flow path constituted by the fuel cell flow path 54, the heat generating body flow path 56, and the cooling unit flow path 52. The flow of the coolant in the heat generating body flow path 56 is stopped during execution of step S2, and thus the temperature of the coolant in the heat generating body flow path 56 is low when step S6 is started. On the other hand, the temperature of the coolant in the fuel cell flow path 54 and the cooling unit flow path 52 is raised to a relatively high temperature during execution of step S2. The coolant in the fuel cell flow path 54 and the cooling unit flow path 52 and the coolant in the heat generating body flow path 56 are mixed with each other while step S2 is performed, and thus the temperature of the coolant in the heat generating body flow path 56 is raised.

In step S6, application of a thermal load to the fuel cell 12 is suppressed by rotating the pump 22 at the lowest rotational speed. For example, if the pump 22 is rotated at a high rotational speed in step S6, the coolant at a low temperature in the heat generating body flow path 56 rapidly flows into the fuel cell flow path 54 via the cooling unit flow path 52. Then, the coolant at a low temperature rapidly flows into the fuel cell 12, the temperature of which has been raised to a relatively high temperature, which abruptly lowers the temperature of the fuel cell 12. Therefore, a thermal shock is applied to the fuel cell 12, and a thermal load is applied to the fuel cell 12. In the actual step S6, on the contrary, the pump 22 is rotated at the lowest rotational speed, and thus the coolant at a low temperature in the heat generating body flow path 56 is gradually merged with the coolant in the fuel cell flow path 54 and the cooling unit flow path 52. Thus, an abrupt drop in the temperature of the fuel cell 12 is suppressed. In addition, step S6 is started when the temperature of the circulated coolant has reached the reference value (i.e. when an affirmative determination is made in step S4), and thus the difference between the temperature of the coolant circulated at the time when step S6 is started (i.e. the coolant in the fuel cell flow path 54 and the cooling unit flow path 52) and the temperature of the coolant in the heat generating body flow path 56 is not so large. This also suppresses an abrupt drop in the temperature of the fuel cell 12 at the time of execution of step S6. Therefore, application of a thermal load to the fuel cell 12 can be suppressed. In addition, step S6 is performed for the purpose of merging the coolant in the heat generating body flow path 56 with the coolant in the fuel cell flow path 54 and the cooling unit flow path 52, and thus no problem is caused if the pump 22 is rotated at the lowest rotational speed. In addition, power consumption by the pump 22 can be suppressed by rotating the pump 22 at the lowest rotational speed.

As discussed above, when it is determined in step S8 that the condition for stopping the pump 22 is met, the integrated ECU 70 stops the pump 22 in step S9. A condition that can determine that the temperature of the coolant in the heat generating body flow path 56 has been raised sufficiently can be adopted as the condition for stopping the pump 22.

For example, the condition for stopping the pump 22 can be that a predetermined time has elapsed since step S6 is started. It can be determined that the temperature of the coolant in the heat generating body flow path 56 has been raised to a certain value or more when a predetermined time has elapsed since step S6 is started. Thus, when a predetermined time has elapsed since step S6 is started, an affirmative determination can be made in step S8, and the pump 22 can be stopped in step S9.

Alternatively, the condition for stopping the pump 22 can be that the temperature of the coolant in the coolant flow path 50 is equal to or more than a reference temperature, for example. For example, the condition for stopping the pump 22 can be that the temperature T1 detected by the temperature sensor 42 is equal to or more than a reference temperature Tb. The reference temperature Tb that is used in step S8 is higher than the reference temperature Ta that is used in step S4. The temperature T1 of the coolant that has passed through the fuel cell 12 is correlated with the temperature of the coolant in the heat generating body flow path 56, and thus it can be determined that the temperature of the coolant in the heat generating body flow path 56 has been raised to a certain value or more when the temperature T1 is equal to or more than the reference temperature Tb. Thus, when the temperature T1 has been raised to the reference temperature Tb or more, an affirmative determination can be made in step S8, and the pump 22 can be stopped in step S9. Alternatively, the condition for stopping the pump 22 can be that the temperature T2 detected by the temperature sensor 44 is equal to or more than a reference temperature Tc, for example. The temperature T2 is the temperature of the coolant in the heat generating body flow path 56. Thus, this stop condition directly determines the temperature of the coolant in the heat generating body flow path 56. Thus, when the temperature T2 has been raised to the reference temperature Tc or more, an affirmative determination can be made in step S8, and the pump 22 can be stopped in step S9.

Alternatively, the condition for stopping the pump 22 may be that the temperature of the coolant in the cooling unit flow path 52 is equal to or more than a predetermined temperature.

After the pump 22 is stopped in step S9, the integrated ECU 70 executes normal control performed during travel of the vehicle. In the normal control, the integrated ECU 70 continuously actuates the fuel cell 12 and the first pump 21. The integrated ECU 70 stops the pump 22 while the brake resistor 28 is stopped. Therefore, the coolant in the heat generating body flow path 56 is not flowing while the brake resistor 28 is stopped. The integrated ECU 70 actuates the pump 22 when the brake resistor 28 is actuated. At this time, the integrated ECU 70 actuates the pump 22 at a high rotational speed that matches the temperature of the brake resistor 28. Thus, the coolant that has been stagnant in the heat generating body flow path 56 is rapidly merged with the coolant in the fuel cell flow path 54 and the cooling unit flow path 52. The coolant in the heat generating body flow path 56 has been warmed in step S6 performed beforehand, and thus no abrupt temperature variations are caused in the fuel cell 12 even when the coolant in the heat generating body flow path 56 is rapidly merged with the coolant in the fuel cell flow path 54 and the cooling unit flow path 52. Consequently, application of a thermal load to the fuel cell 12 is suppressed. With the coolant in the heat generating body flow path 56 warmed through preliminary operation performed immediately after the vehicle is started in this manner, application of a thermal load to the fuel cell 12 can be suppressed even when the coolant in the heat generating body flow path 56 rapidly flows into the fuel cell flow path 54 as the brake resistor 28 is actuated thereafter.

The reference temperature Ta according to the first embodiment is an example of the first reference value for the first fuel cell cooling system. The reference temperature Tb according to the first embodiment is an example of the second reference value for the first fuel cell cooling system.

Second Embodiment

Figure 3:
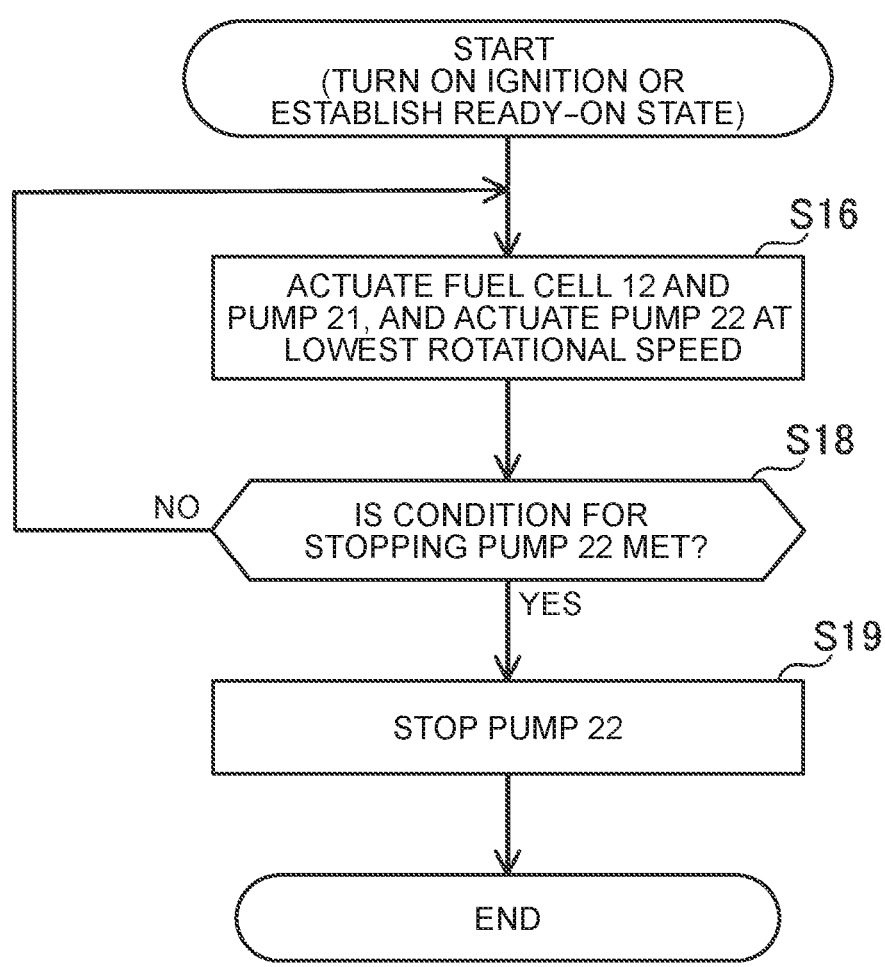
FIG. 3 is a flowchart illustrating preliminary operation according to a second embodiment.

FIG. 3 illustrates the preliminary operation according to the second embodiment. As indicated in FIG. 3, the preliminary operation according to the second embodiment is performed immediately after ignition is turned on or a ready-on state is established (i.e. the vehicle is started). The integrated ECU 70 performs step S16 immediately after ignition is turned on. In step S16, the integrated ECU 70 actuates the fuel cell 12 and the pump 21, and actuates the pump 22 at the lowest rotational speed. That is, in the second embodiment, unlike the first embodiment, not only the pump 21 but also the pump 22 is actuated immediately after ignition is turned on. With the pumps 21 and 22 actuated, the coolant is circulated through the circulation flow path constituted by the fuel cell flow path 54, the heat generating body flow path 56, and the cooling unit flow path 52. Therefore, the coolant circulated in the circulation flow path constituted by the fuel cell flow path 54, the heat generating body flow path 56, and the cooling unit flow path 52 is heated by the fuel cell 12, and cooled by the radiators 14 and 16. The temperature of the circulated coolant is gradually raised as the coolant is heated by the fuel cell 12 while step S16 is performed. Thus, the temperature of the coolant in the heat generating body flow path 56 is gradually raised while step S16 is performed. In step S16, the pump 22 is actuated for the purpose of merging the coolant in the heat generating body flow path 56 with the coolant in the fuel cell flow path 54 and the cooling unit flow path 52, and thus no problem is caused when the pump 22 is rotated at the lowest rotational speed. In addition, power consumption by the pump 22 can be suppressed by rotating the pump 22 at the lowest rotational speed. The integrated ECU 70 repeatedly makes a determination in step S18 (a determination as to whether the condition for stopping the pump 22 is met) while step S16 is performed. The condition for stopping the pump 22 is the same as the one described in relation to the first embodiment. For example, the condition for stopping the pump 22 can be that the temperature T1 detected by the temperature sensor 42 is equal to or more than a reference temperature Tb. When an affirmative determination is made in step S18, the integrated ECU 70 stops the pump 22 in step S19.

After the pump 22 is stopped in step S19, the integrated ECU 70 executes normal control performed during travel of the vehicle. In the normal control, the integrated ECU 70 continuously actuates the fuel cell 12 and the first pump 21. In addition, the integrated ECU 70 stops the pump 22 while the brake resistor 28 is stopped, and actuates the pump 22 while the brake resistor 28 is actuated. When the pump 22 is actuated as the brake resistor 28 is actuated, the coolant that has been stagnant in the heat generating body flow path 56 is rapidly merged with the coolant in the fuel cell flow path 54 and the cooling unit flow path 52. However, the coolant in the heat generating body flow path 56 has been warmed in step S18 performed beforehand, and thus no abrupt temperature variations are caused in the fuel cell 12. Consequently, application of a thermal load to the fuel cell 12 is suppressed.

The reference temperature Tb according to the second embodiment is an example of the reference value for the second fuel cell cooling system.

Third Embodiment

Figure 4:
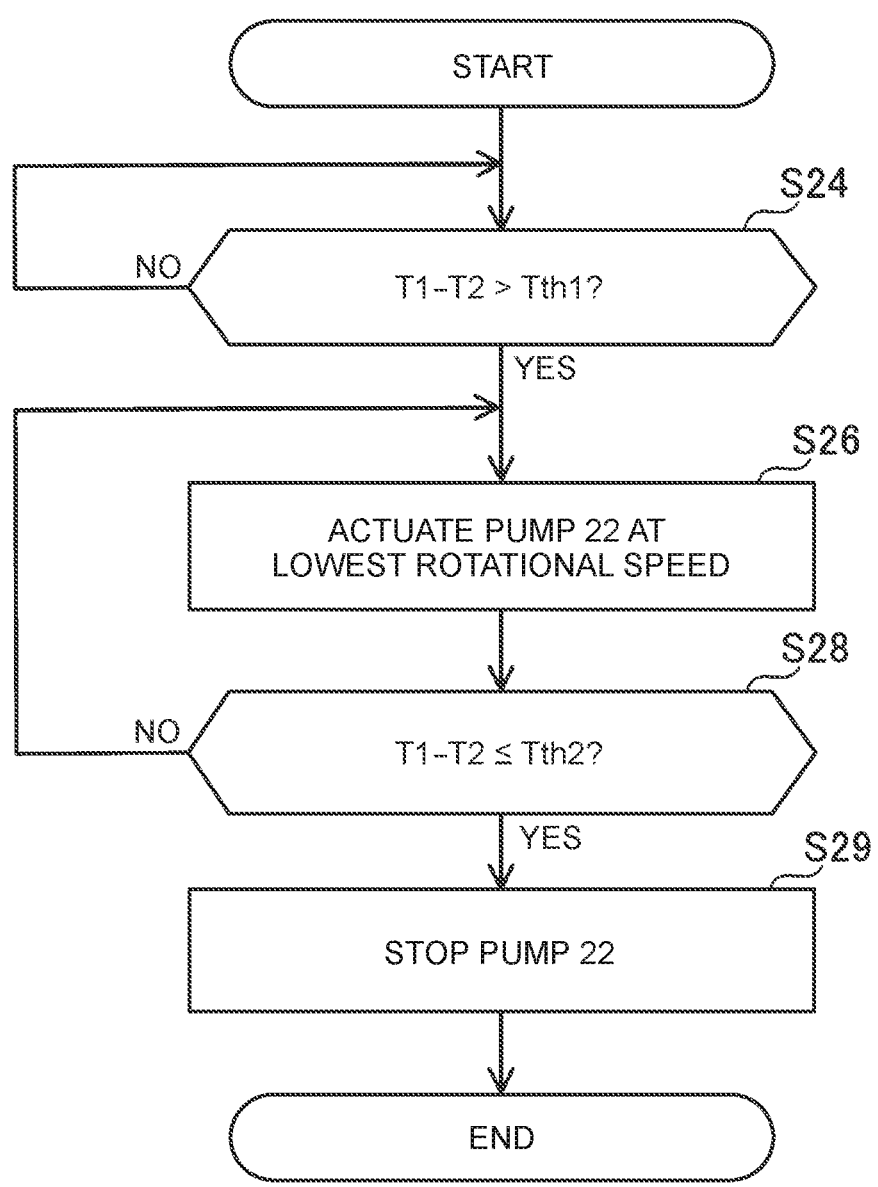
FIG. 4 is a flowchart illustrating preliminary operation according to a third embodiment.

FIG. 4 illustrates the preliminary operation according to the third embodiment. The preliminary operation according to the third embodiment is executed when the brake resistor 28 is stopped during travel of the vehicle. When the brake resistor 28 operates during travel of the vehicle, operation to cool the brake resistor 28 is performed in preference to the preliminary operation according to the third embodiment.

As discussed above, the preliminary operation in FIG. 4 is executed when the brake resistor 28 is stopped during travel of the vehicle. Thus, when the preliminary operation in FIG. 4 is started, the fuel cell 12 and the pump 21 are actuated, and the pump 22 is stopped. In step S24, the integrated ECU 70 determines whether the difference between the temperature T1 of the coolant in the fuel cell flow path 54 and the temperature T2 of the coolant in the heat generating body flow path 56 is more than a reference value Tth. The integrated ECU 70 repeatedly executes the determination in step S24 unless T1−T2>Tth1 is met.

In the state at the time when the preliminary operation in FIG. 4 is started (i.e. in the state in which the fuel cell 12 and the pump 21 are actuated and the pump 22 is stopped), the coolant is circulated through the circulation flow path constituted by the fuel cell flow path 54 and the cooling unit flow path 52, and the coolant in the heat generating body flow path 56 is not flowing. The circulated coolant is heated by the fuel cell 12, and thus is at a certain temperature or more. On the other hand, the coolant in the heat generating body flow path 56 is stagnant, and thus the temperature of the coolant in the heat generating body flow path 56 is low. When the temperature T1 of the coolant in the fuel cell flow path 54 is raised because of heat generated by the fuel cell 12, or when the temperature T2 of the coolant in the heat generating body flow path 56 is lowered because of the lapse of time, the difference between the temperature T1 and the temperature T2 becomes more than the reference value Tth1. In this case, the integrated ECU 70 makes an affirmative determination in step S24, and executes step S26.

In step S26, the integrated ECU 70 actuates the pump 22. That is, the integrated ECU 70 actuates the pump 22 while maintaining the fuel cell 12 and the pump 21 in the actuated state. In step S26, the integrated ECU 70 rotates the pump 22 at the lowest rotational speed. The coolant in the heat generating body flow path 56 is caused to flow by actuating the pump 22. That is, in step S26, the coolant is circulated in the circulation flow path constituted by the fuel cell flow path 54, the heat generating body flow path 56, and the cooling unit flow path 52. That is, in step S26, the coolant in the heat generating body flow path 56 is raised by mixing the coolant at a low temperature in the heat generating body flow path 56 with the coolant at a relatively high temperature in the fuel cell flow path 54 and the cooling unit flow path 52. In step S26, the pump 22 is rotated at the lowest rotational speed, and thus the coolant at a low temperature in the heat generating body flow path 56 is gradually merged with the coolant in the fuel cell flow path 54 and the cooling unit flow path 52. Thus, an abrupt drop in the temperature of the fuel cell 12 is suppressed. Therefore, application of a thermal load to the fuel cell 12 can be suppressed. In addition, step S26 is performed for the purpose of merging the coolant in the heat generating body flow path 56 with the coolant in the fuel cell flow path 54 and the cooling unit flow path 52, and thus no problem is caused when the pump 22 is rotated at the lowest rotational speed. In addition, power consumption by the pump 22 can be suppressed by rotating the pump 22 at the lowest rotational speed.

As discussed above, the coolant in the heat generating body flow path 56 and the coolant in the fuel cell flow path 54 are mixed with each other in step S26, and thus the difference between the temperature T1 of the coolant in the fuel cell flow path 54 and the temperature T2 of the coolant in the heat generating body flow path 56 is reduced during step S26. The integrated ECU 70 repeatedly makes the determination in step S28 while step S26 is performed. In step S28, the integrated ECU 70 determines whether the difference between the temperature T1 and the temperature T2 is equal to or less than a reference value Tth2. The reference value Tth2 is a value that is equal to or less than the reference value Tth1. When the difference between the temperature T1 and the temperature T2 is equal to or less than the reference value Tth2, the integrated ECU 70 makes an affirmative determination in step S28, and stops the pump 22 in step S29. That is, when the temperature difference between the temperature T1 and the temperature T2 is reduced to be equal to or less than the reference value Tth2 by performing step S26, the integrated ECU 70 makes an affirmative determination in step S28, and stops the pump 22 in step S29. After the pump 22 is stopped in step S29, the integrated ECU 70 executes normal control performed during travel of the vehicle.

In this manner, in the third embodiment, the difference between the temperature T1 and the temperature T2 is monitored by repeatedly performing step S24 during travel of the vehicle. When the difference between the temperature T1 and the temperature T2 exceeds the reference value Tth1, step S26 is performed to reduce the difference between the temperature T1 and the temperature T2 to a value that is equal to or less than the reference value Tth2. Therefore, in the third embodiment, the difference between the temperature T1 and the temperature T2 is suppressed from becoming significantly large during travel of the vehicle.

In the normal control, the integrated ECU 70 continuously actuates the fuel cell 12 and the first pump 21. In addition, the integrated ECU 70 stops the pump 22 while the brake resistor 28 is stopped, and actuates the pump 22 while the brake resistor 28 is actuated. When the pump 22 is actuated as the brake resistor 28 is actuated, the coolant that has been stagnant in the heat generating body flow path 56 is rapidly merged with the coolant in the fuel cell flow path 54 and the cooling unit flow path 52. However, the difference between the temperature T1 and the temperature T2 is suppressed from becoming significantly large during travel of the vehicle by the preliminary operation according to the third embodiment. Thus, no abrupt temperature variations are caused in the fuel cell 12 even when the pump 22 is actuated as the brake resistor 28 is actuated (i.e. even when the coolant in the heat generating body flow path 56 is merged with the coolant in the fuel cell flow path 54 and the cooling unit flow path 52). Consequently, application of a thermal load to the fuel cell 12 is suppressed.

The reference value Tth1 according to the third embodiment is an example of the first reference value for the third fuel cell cooling system. The reference value Tth2 according to the third embodiment is an example of the second reference value for the third fuel cell cooling system.

Fourth Embodiment

The preliminary operation according to the fourth embodiment illustrated in FIG. 5 is different from the preliminary operation according to the third embodiment in that the brake resistor 28 is actuated together with the pump 22 in step S26 and that the brake resistor 28 is stopped together with the pump 22 in step S29. The preliminary operation according to the fourth embodiment is otherwise the same as the preliminary operation according to the third embodiment.

In step S26 according to the fourth embodiment, the integrated ECU 70 actuates the brake resistor 28 together with the pump 22. That is, in step S26, the integrated ECU 70 actuates the brake resistor 28 even if extra electric power is not generated by the motor. In step S26 according to the fourth embodiment, the brake resistor 28 is actuated, and thus the coolant in the heat generating body flow path 56 is heated by the brake resistor 28. Therefore, in step S26 according to the fourth embodiment, the difference between the temperature T1 and the temperature T2 can be reduced more quickly than in step S26 according to the third embodiment. In step S29 according to the fourth embodiment, the integrated ECU 70 returns to the normal control by stopping the brake resistor 28 together with the pump 22.

While the heat generating body installed in the heat generating body flow path 56 is the brake resistor 28 in the embodiments discussed above, a different heat generating body may be installed in the heat generating body flow path 56.

While the pump 21 is disposed upstream of the fuel cell 12 in the fuel cell flow path 54 in the embodiments discussed above, the pump 21 may be disposed downstream of the fuel cell 12. While the pump 22, the brake resistor 28, and the check valve 30 are disposed in this order from the upstream side in the heat generating body flow path 56 in the embodiments discussed above, these devices may be disposed in a different order.

While the embodiments have been described in detail above, these are merely illustrative, and do not limit the scope of the claims. The technology set forth in the claims includes various modifications and variations of the specific embodiments described above. The technical elements described herein or illustrated in the drawings exhibit their technical utility alone or in various combinations, and are not limited to the combinations set forth in the claims at the time of filing. In addition, the technology described herein or illustrated in the drawings could achieve a plurality of objects at the same time, and have its technical utility by achieving one of such objects itself

What is claimed is:

1. A fuel cell cooling system mounted on a vehicle, the fuel cell cooling system comprising:
    a coolant flow path inside which a coolant flows, the coolant flow path including a cooling unit flow path, a fuel cell flow path, and a heat generating body flow path, an upstream end of the fuel cell flow path and an upstream end of the heat generating body flow path being connected to a branched portion provided at a downstream end of the cooling unit flow path, and a downstream end of the fuel cell flow path and a downstream end of the heat generating body flow path being connected to a merged portion provided at an upstream end of the cooling unit flow path;
    a cooling unit configured to cool the coolant in the cooling unit flow path;
    a fuel cell configured to be cooled through heat exchange with the coolant in the fuel cell flow path;
    a heat generating body configured to generate heat when actuated and configured to be cooled through heat exchange with the coolant in the heat generating body flow path;
    a first pump configured to pump the coolant in the fuel cell flow path to a downstream side;
    a second pump configured to pump the coolant in the heat generating body flow path to a downstream side; and
    a control circuit configured to control the fuel cell, the first pump, and the second pump, wherein
    the control circuit is configured to actuate the fuel cell and the first pump during travel of the vehicle,
    the control circuit is configured to actuate the second pump while the heat generating body is actuated, and
    the control circuit is configured to perform, when the vehicle is started, a first process of actuating the first pump with the second pump stopped, and a second process of actuating the second pump in addition to the first pump when a temperature of the coolant in the fuel cell flow path or the cooling unit flow path exceeds a first reference value during the first process.

2. The fuel cell cooling system according to claim 1, wherein the control circuit is configured to perform a third process of stopping the second pump when a temperature of the coolant in the coolant flow path exceeds a second reference value during the second process.

3. The fuel cell cooling system according to claim 1, wherein the control circuit is configured to actuate the second pump at a lowest rotational speed in the second process.

4. A fuel cell cooling system mounted on a vehicle, the fuel cell cooling system comprising:
    a coolant flow path inside which a coolant flows, the coolant flow path including a cooling unit flow path, a fuel cell flow path, and a heat generating body flow path, an upstream end of the fuel cell flow path and an upstream end of the heat generating body flow path being connected to a branched portion provided at a downstream end of the cooling unit flow path, and a downstream end of the fuel cell flow path and a downstream end of the heat generating body flow path being connected to a merged portion provided at an upstream end of the cooling unit flow path;
    a cooling unit configured to cool the coolant in the cooling unit flow path;
    a fuel cell configured to be cooled through heat exchange with the coolant in the fuel cell flow path;
    a heat generating body configured to generate heat when actuated and configured to be cooled through heat exchange with the coolant in the heat generating body flow path;
    a first pump configured to pump the coolant in the fuel cell flow path to a downstream side;
    a second pump configured to pump the coolant in the heat generating body flow path to a downstream side; and
    a control circuit configured to control the fuel cell, the first pump, and the second pump, wherein
    the control circuit is configured to actuate the fuel cell and the first pump during travel of the vehicle,
    the control circuit is configured to actuate the second pump while the heat generating body is actuated, and
    the control circuit is configured to perform a first process of actuating the first pump and the second pump when the vehicle is started.

5. The fuel cell cooling system according to claim 4, wherein the control circuit is configured to perform a second process of stopping the second pump when a temperature of the coolant in the coolant flow path exceeds a reference value during the first process.

6. The fuel cell cooling system according to claim 4, wherein the control circuit is configured to actuate the second pump at a lowest rotational speed in the first process.

7. A fuel cell cooling system mounted on a vehicle, the fuel cell cooling system comprising:
    a coolant flow path inside which a coolant flows, the coolant flow path including a cooling unit flow path, a fuel cell flow path, and a heat generating body flow path, an upstream end of the fuel cell flow path and an upstream end of the heat generating body flow path being connected to a branched portion provided at a downstream end of the cooling unit flow path, and a downstream end of the fuel cell flow path and a downstream end of the heat generating body flow path being connected to a merged portion provided at an upstream end of the cooling unit flow path;
    a cooling unit configured to cool the coolant in the cooling unit flow path;
    a fuel cell configured to be cooled through heat exchange with the coolant in the fuel cell flow path;
    a heat generating body configured to generate heat when actuated and configured to be cooled through heat exchange with the coolant in the heat generating body flow path;
    a first pump configured to pump the coolant in the fuel cell flow path to a downstream side;
    a second pump configured to pump the coolant in the heat generating body flow path to a downstream side; and
    a control circuit configured to control the fuel cell, the first pump, and the second pump, wherein
    the control circuit is configured to actuate the fuel cell and the first pump during travel of the vehicle,
    the control circuit is configured to actuate the second pump while the heat generating body is actuated, and
    the control circuit is configured to perform a first process of actuating the second pump when a difference between a temperature of the coolant in the fuel cell flow path and a temperature of the coolant in the heat generating body flow path exceeds a first reference value when the heat generating body is not actuated during travel of the vehicle.

8. The fuel cell cooling system according to claim 7, wherein the control circuit is configured to perform a second process of stopping the second pump when the difference between the temperature of the coolant in the fuel cell flow path and the temperature of the coolant in the heat generating body flow path falls below a second reference value during the first process.

9. The fuel cell cooling system according to claim 7, wherein the control circuit is configured to actuate the heat generating body in the first process.

10. The fuel cell cooling system according to claim 7, wherein the control circuit is configured to actuate the second pump at a lowest rotational speed in the first process.

* * * * *